United States Patent [19]
Kawai et al.

[11] Patent Number: 5,802,922
[45] Date of Patent: Sep. 8, 1998

[54] SHIFT LEVER SUPPORTING MECHANISM FOR A MANUAL TRANSMISSION

[75] Inventors: Hiroshi Kawai; Yoshitaka Sogo; Mitsuyuki Hasegawa; Toshio Tanba, all of Kariya, Japan

[73] Assignees: Tsuda Kogyo Kabushiki Kaisha, Kariya; Aisin Ai Co., Ltd., Nishio, both of Japan

[21] Appl. No.: 668,359

[22] Filed: Jun. 26, 1996

[30]    Foreign Application Priority Data

Jul. 5, 1995  [JP]  Japan .................................. 7-169865

[51] Int. Cl.⁶ .................................................. B60K 20/04
[52] U.S. Cl. ........................... 74/473 P; 74/527; 74/528; 74/531
[58] Field of Search .................. 74/473 P, 527, 74/528, 471 XY, 531

[56]    References Cited

U.S. PATENT DOCUMENTS

| | | | |
|---|---|---|---|
| 1,550,029 | 8/1925 | Johnson | 74/473 P |
| 3,513,716 | 5/1970 | Evans | 74/473 P |
| 4,333,360 | 6/1982 | Simmons | 74/473 P |
| 4,569,245 | 2/1986 | Feldt et al. | |
| 4,581,951 | 4/1986 | Watson | 74/473 P |
| 5,156,065 | 10/1992 | Fujimoto et al. | 74/527 |
| 5,205,538 | 4/1993 | Mackoway, Jr. et al. | 74/527 |
| 5,213,002 | 5/1993 | Langhof et al. | 74/473 P |
| 5,309,784 | 5/1994 | Xobayashi et al. | 4/527 |
| 5,313,853 | 5/1994 | Olmsted et al. | |
| 5,345,050 | 9/1994 | Branch et al. | 74/527 |
| 5,476,021 | 12/1995 | Bürger | 74/527 |

FOREIGN PATENT DOCUMENTS

| | | | |
|---|---|---|---|
| 137428 | 9/1979 | Germany | 74/473 P |
| 6-17929 | 1/1994 | Japan | 74/473 P |

*Primary Examiner*—Charles A. Marmor
*Assistant Examiner*—David M. Fenstermacher
*Attorney, Agent, or Firm*—Dennison, Meserole, Pollack & Scheiner

[57]    ABSTRACT

A shift lever supporting mechanism for supporting a shift lever in a manual transmission and having a shift lever retainer, the shift lever having an enlarged spherical portion retained in the shift lever retainer through sphere-to-sphere engagement so that the shift lever is pivotally moved for performing the selecting and shifting operations. The shift lever includes a hollow support provided on the enlarged spherical portion of the shift lever and aligned with a rotational axis of the enlarged spherical portion for the shifting operations of the shift lever, at least one spherical member received in the hollow support, a spring received in the hollow support for biasing the spherical member, and at least one cam portion provided on the shift lever retainer and having at least one inclined cam surface. The at least one spherical member is urged to the at least one cam portion by a spring force of the spring. When the shift lever is moved for performing the selecting operations, the at least one spherical member moves along the cam surface of the cam portion while being forced into the hollow support against the spring force of the spring.

5 Claims, 6 Drawing Sheets

SHIFT LEVER SUPPORTING MECHANISM FOR A MANUAL TRANSMISSION

BACKGROUND OF THE INVENTION

1. Field of the Invention

The present invention relates to a shift lever supporting mechanism for supporting a shift lever in an automotive manual transmission, and more particularly to a shift lever supporting mechanism for supporting a floor-type shift lever in an automotive manual transmission.

2. Prior Art

FIG. 8 exemplarily shows a conventional shift lever supporting mechanism for supporting a shift lever in a manual transmission having an H-shaped pattern. As shown therein, a shift lever 70 includes an enlarged spherical portion 71. The enlarged spherical portion 71 is received in a shift lever retainer 80 and is retained therein through sphere-to-sphere engagement so that the shift lever 70 is pivotally moved for performing selecting and shifting operations. The shift lever 70 also includes a reduced spherical portion 72 formed on the lower end thereof. The reduced spherical portion 72 is coupled (ball-and-socket jointed) to a socket or lever housing 73 provided on a shift and select shaft (not shown) which transfers the motion of the shift lever 70 to the transmission therethrough. The shift lever supporting mechanism includes a pair of opposite return pins 84. The return pins 84 are spring biased to contact opposite side surfaces of the lever housing 73. When the shift lever 70 is moved from a predetermined neutral select position shown therein (in which the shift lever 70 can be shifted to a third gear shift position or a fourth gear position by the shifting operations) in either of directions indicted by the arrows for selecting a desired select position, that is, when the shift lever 70 is moved for performing a desired selecting operation, corresponding one of the return pins 84 is pushed against a spring force of a spring 85. Thus, when the shift lever 70 is in another select position, an increased spring force of the spring 85 is applied to the lever housing 73. This increased spring force may act as a return force to spring back the shift lever 70 to the neutral select position.

As described above, such a shift lever supporting mechanism utilizes the return pins 84 arranged at both sides of the lever housing 73 and the springs 85 coupled to the respective return pins 84 as a return force producing mechanism for developing the return force. This may lead to increased dimension of the return force producing mechanism, and in turn, to increased overall dimension of the shift lever supporting mechanism.

In the conventional shift lever supporting mechanism, a force caused by the return force cannot be uniformly applied on the enlarged spherical portion. This may lead to undesirable motion of the shift lever.

Moreover, in the conventional shift lever supporting mechanism, special purpose members are required to restrict the direction of pivotal movement of the enlarged spherical portion of the shift lever in the shift lever retainer so that the shift lever is moved only in predetermined directions.

Other prior art shift lever supporting mechanisms are disclosed in, for example, U.S. Pat. Nos. 4,569,245 and 5,313,853.

SUMMARY OF THE INVENTION

It is an object of the invention to provide a shift lever supporting mechanism in which a return force producing mechanism for producing a return force is effectively miniaturized.

It is another object of the invention to provide a shift lever supporting mechanism in which a force caused by a return force can be uniformly applied on an enlarged spherical portion of a shift lever to eliminate undesirable motion of the the shift lever, thereby improving an operational feel of the shift lever.

It is a further object of the invention to provide a shift lever supporting mechanism in which an enlarged spherical portion of a shift lever can be effectively restricted by the direction of pivotal movement in a shift lever retainer without using special purpose members.

According to the present invention, there is provided a shift lever supporting mechanism for supporting a shift lever in a manual transmission and having a shift lever retainer, the shift lever having an enlarged spherical portion retained in the shift lever retainer through sphere-to-sphere engagement so that the shift lever is pivotally moved for performing the selecting and shifting operations, which includes a hollow support provided on the enlarged spherical portion of the shift lever and aligned with a rotational axis of the enlarged spherical portion for the shifting operations of the shift lever, at least one spherical member received in the hollow support, a spring received in the hollow support for biasing the spherical member, and at least one cam portion provided on the shift lever retainer and having at least one inclined cam surface. The at least one spherical member is urged to the at least one cam portion by a spring force of the spring. When the shift lever is moved for performing the selecting operations, the at least one spherical member moves along the cam surface of the cam portion while being forced into the hollow support against the spring force of the spring.

With this shift lever supporting mechanism, the at least one spherical member moves along the cam surface of the cam portion while being forced into the hollow support against the spring force of the spring. Thus, the spring force of the spring may act as a return force to urge the shift lever to a predetermined neutral select position. The spring and the spherical member for producing the return force are received in the hollow support provided on the enlarged spherical portion of the shift lever, thereby offering the advantage that a return force producing mechanism for producing the return force may be effectively miniaturized.

The hollow support may penetrate through the enlarged spherical portion, and the at least one spherical member and the at least one cam portion may be two in number. The spherical members may be arranged at respective ends of the hollow support. Further, the spherical members are urged to the cam portions. With this shift lever supporting mechanism, the return force is produced at each end of the hollow support when the shift lever is moved for performing the selecting operations. As a result, a force caused by the return force may be uniformly applied to the enlarged spherical portion of the shift lever to eliminate undesirable motion of the shift lever. This may provide an excellent operational feel of the shift lever.

The hollow support may include a cylindrical sleeve having opposed end portions and penetrates through the enlarged spherical portion. Also, the cam portions may be formed as cam grooves extending in directions along which the enlarged spherical portion rotates when the shift lever is moved for performing the selecting operations. Moreover, the end portions of the cylindrical sleeve may be inserted in the cam grooves, so that the enlarged spherical portion of the shift lever is restricted by the direction of pivotal movement in the shift lever retainer. Alternatively, the hollow support may include a through bore formed in the enlarged spherical portion. Also, the cam portions may be formed as cam grooves extending in directions along which the enlarged spherical portion rotates when the shift lever is moved for performing the selecting operations. Moreover, the spherical members may be inserted in the cam grooves, so that the enlarged spherical portion of the shift lever is restricted by the direction of pivotal movement in the shift lever retainer. With these shift lever supporting mechanisms, the cylindrical sleeve of the hollow support or the spherical members cooperates with the cam portions to restrict the direction of pivotal movement of the enlarged spherical portion of the shift lever in the shift lever retainer. This may eliminate special purpose members for restricting the direction of pivotal movement of the spherical portion of the shift lever, thereby permitting a reduced number of elements for manufacturing the shift lever supporting mechanism. As a result, the shift lever supporting mechanism is significantly simplified.

The at least one cam surface may include two cam surfaces corresponding to directions for the selecting operations of the shift lever. With this shift lever supporting mechanism, the inclination angles of the respective cam surfaces may be individually determined so that the compression rate of the spring in one select position of the shift lever is different from that in the other select position of the shift lever. Thus, the return force in one select position of the shift lever may be preferably different from that in the other select position of the shift lever.

The present invention will become more fully apparent from the claims and the description as it proceeds in connection with the drawings.

DETAILED DESCRIPTION OF THE PREFERRED EMBODIMENTS

Preferred embodiments of the invention will now be described in detail with reference to the drawings.

Figure 1:
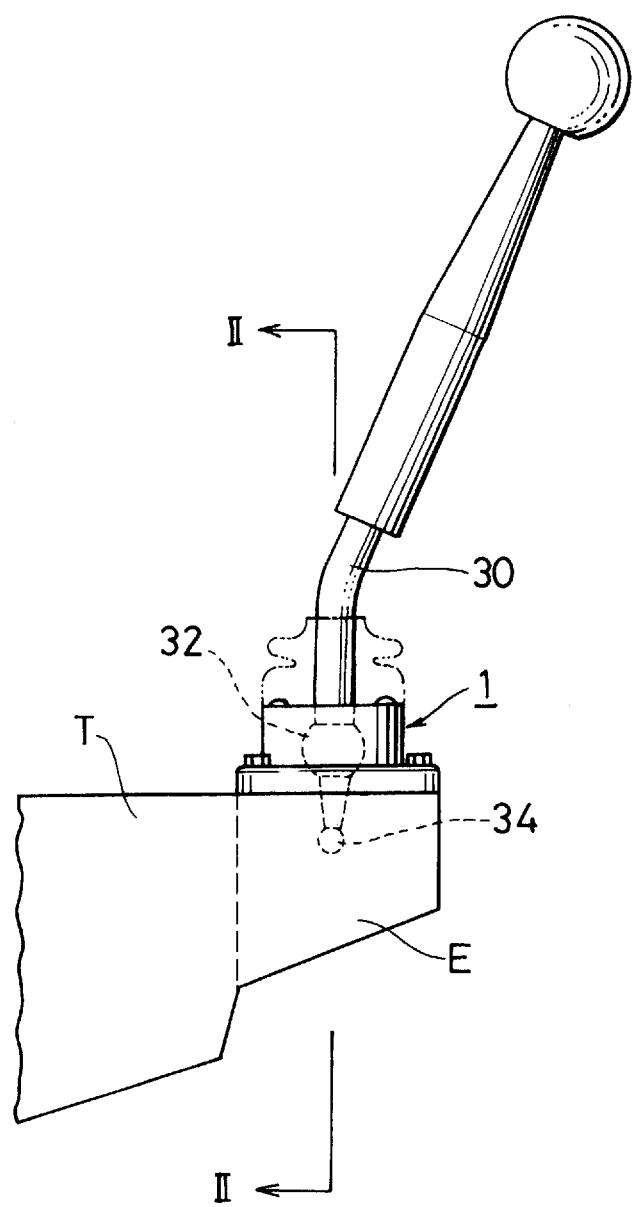
FIG. 1 is a side view of a shift lever supporting mechanism incorporating a first embodiment of the invention, showing the same in association with an automotive manual transmission.
Figure 2:
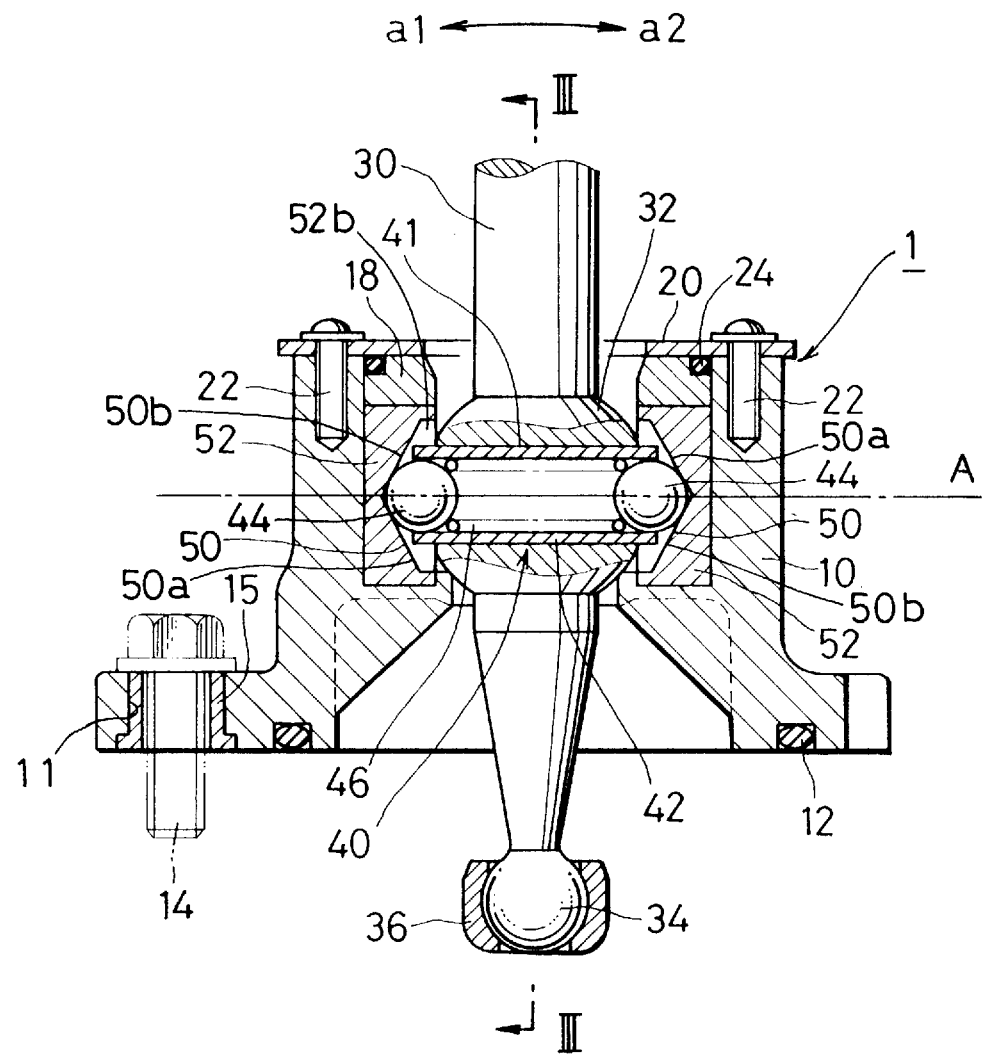
FIG. 2 is a sectional view taken along the line II—II in FIG. 1.

Referring to FIGS. 1 to 6, shown therein is a first embodiment of the invention. As shown in these drawings, a shift lever supporting mechanism 1 for supporting a floor-type shift lever 30 in an automotive manual transmission includes a shift lever retainer 10 integrally formed of synthetic resin. The shift lever retainer 10 is a hollow member having a substantially cylindrical configuration and having upper and lower open ends. The shift lever retainer 10 is fixedly mounted on an extension housing E extended from a transmission housing T (FIG. 1) by bolts 14 (only one of which is shown in FIG. 2) inserted into through holes 11 formed thereon. A metal bushing 15 is received in each through hole 11 to prevent looseness of the bolts 14 which may be caused by creep of the synthetic resin or other factors. Further, the lower surface of the shift lever retainer 10 is provided with an annular resilient member or resilient O-ring 12 for completely sealing between the lower surface of the shift lever retainer 10 and a mating surface of the extension housing E.

Figure 3:
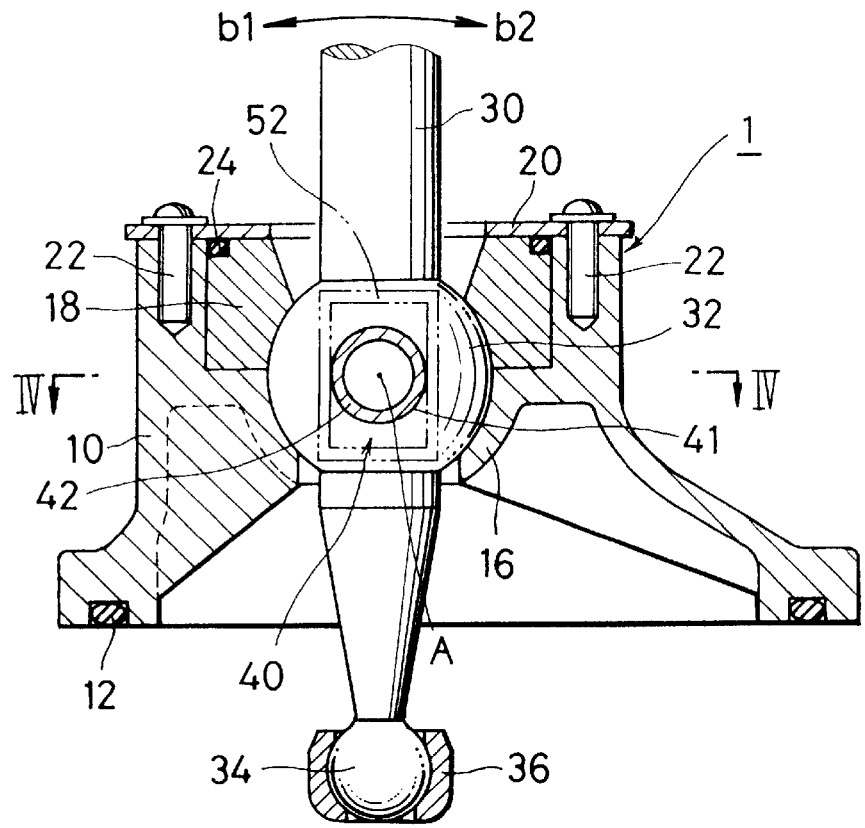
FIG. 3 is a sectional view taken along the line III—III in FIG. 2.

The shift lever retainer 10 receives the shift lever 30 therein. As shown in FIG. 3, the shift lever retainer 10 includes a pair of receiving portions 16 oppositely formed therein and having concave spherical surfaces. On the other hand, the shift levers 30 includes an enlarged spherical portion 32 integrally formed thereon and having a convex spherical surface corresponding to the concave spherical surface of the receiving portions 16. The enlarged spherical portion 32 is partially retained at the lower half thereof by the receiving portions 16. Also, the upper open end of the shift lever retainer 10 is fitted with a retainer piece 18 having a concave spherical surface for downwardly biasing a part of the upper half of the enlarged spherical portion 32 of the shift lever 30. The upper open end of the shift lever retainer 10 is provided with a plate-like cover 20 fixed to an end surface thereof by bolts 22. Further, the upper surface of the retainer piece 18 is provided with a resilient annular member or resilient O-ring 24 so that the retainer piece 18 is sufficiently held down by the cover 20. Thus, the enlarged spherical portion 32 of the shift lever 30 is retained in the shift lever retainer 10 through sphere-to-sphere engagement so that the shift lever 30 is pivotally moved in the directions indicated by the arrows a1 and a2 in FIG. 2 for the selecting operations and in the directions indicated by the arrows b1 and b2 in FIG. 3 for the shifting operations.

The shift lever 30 also includes a reduced spherical portion 34 formed on the lower end thereof. The reduced spherical portion 34 is provided with a bushing 36 and coupled to a lever housing (not shown) provided on a shift and select shaft (not shown) which transfers the motion of the shift lever 30 to the transmission therethrough. Thus, the shift lever 30 may perform the selecting operations for changing the select position thereof when it is moved in the directions indicated by the arrows a1 and a2 in FIG. 2, and also may perform the shifting operations for changing the drive ratio of the transmission when it is moved in the directions indicated by, the arrows b1 and b2 in FIG. 3.

Figure 4:
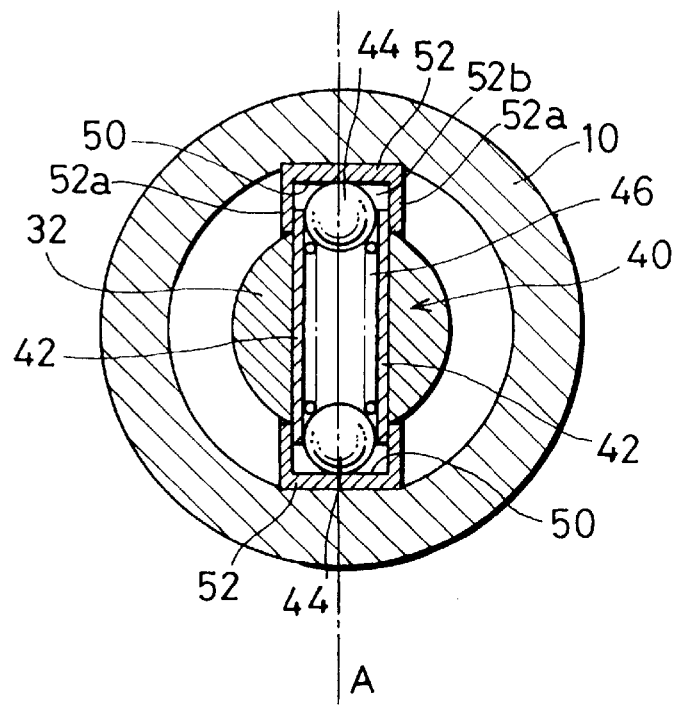
FIG. 4 is a sectional view taken along the line IV—IV in FIG. 3.

As best shown in FIGS. 2 and 4, the shift lever retainer 10 is also provided with a pair of diametrically opposed holders 52 which are arranged along a rotational axis A of the enlarged spherical portion 32 in the shifting operations of the shift lever 30. Each holder 52 is fixedly received in the shift lever retainer 10 and formed with a depressed cam portion 50. The cam portion 50 is constituted of a pair of inclined cam surfaces 50a and 50b and has a generally V-shaped configuration in cross section. As will be appreciated, these holders 52 are previously received in the shift lever retainer 10 before the retainer piece 18 is fitted to the upper open end of the shift lever retainer 10.

The enlarged spherical portion 32 is provided with a hollow support 40 for movably supporting a pair of spherical members or balls (which will be explained hereinafter). The hollow support 40 is aligned with the rotational axis A and constituted of a through bore 41 formed through the enlarged spherical portion 32, and a cylindrical sleeve 42 press fitted in the through bore 41 and having opposed open ends. As will be recognized, each open end of the sleeve 42 faces the cam portion 50 of the holder 52. The cylindrical sleeve 42 receives the spherical members or balls 44 at the open ends thereof. Also, the cylindrical sleeve 42 receives a spring 46 therein for oppositely outwardly biasing the balls 44. Thus, the balls 44 are movably supported on the open ends of the cylindrical sleeve 42 of the hollow support 40 and biased to the cam portions 50 of the holder 52 by a spring force of the spring 46, respectively. Further, each ball 44 is adapted to face an intersection of the cam surfaces 50a and 50b when the shift lever 30 is in a predetermined neutral select position.

As best shown in FIG. 4, the cylindrical sleeve 42 is slightly projected from the enlarged spherical portion 32 at both end portions thereof. On the other hand, each holder 52 is provided with side walls 52a to form therein a vertical cam groove 52b into which each projected end portion of the cylindrical sleeve 42 is inserted. As will be appreciated, the vertical cam groove 52b extends in the directions along which the enlarged spherical portion 32 rotates when the shift lever 30 is moved for performing the selecting operations. Thus, the enlarged spherical portion 32 of the shift lever 30 is restricted by the direction of pivotal movement in the shift lever retainer 10 so that the shift lever 30 is moved only in the directions indicated by the arrows a1 and a2 in FIG. 2 for the selecting operations and the directions indicated by the arrows b1 and b2 in FIG. 3 for the shifting operations.

The operation of the shift lever supporting mechanism 1 will now be described with reference to FIGS. 2, 5 and 6.

When the shift ever 30 is in the neutral select position as shown in FIG. 2, each ball 44 is located centrally of the cam portion 50 so as to face the intersection of the cam surfaces 50a and 50b. When the shift lever 30 is pivotally moved in the direction indicated by the arrow a1 in FIG. 2, that is, when a leftward selecting operation of the shift lever 30 is carried out as shown in FIG. 5, the cylindrical sleeve 42 is rotated with the enlarged spherical portion 32, and the ball 44 is moved along the cam surface 50a while it is forced into the cylindrical sleeve 42 against the spring force of the spring 46. Conversely, when the shift lever 30 is pivotally moved in the direction indicated by the arrow a2 in FIG. 2, that is, when a rightward selecting operation of the shift lever 30 is carried out, the cylindrical sleeve 42 is rotated with the enlarged spherical portion 32, and the ball 44 is moved along the cam surface 50b while it is forced into the cylindrical sleeve 42 against the spring force of the spring 46. As will be recognized, the leftward selecting operation of the shift lever 30 corresponds to a selecting operation for selecting a lower select position of the shift lever 30. In the lower select position, the shift lever 30 can be operated in the directions indicated by the arrows b1 and b2 so as to obtain, for example, a first gear shift position and a second gear shift position. Further, the rightward selecting operation of the shift lever 30 corresponds to a selecting operation for selecting a higher select position of the shift lever 30. In the higher select position, the shift lever 30 can be similarly operated in the directions indicated by the arrows b1 and b2 so as to obtain, for example, a fifth gear shift position and a reverse gear shift position.

Figure 5:
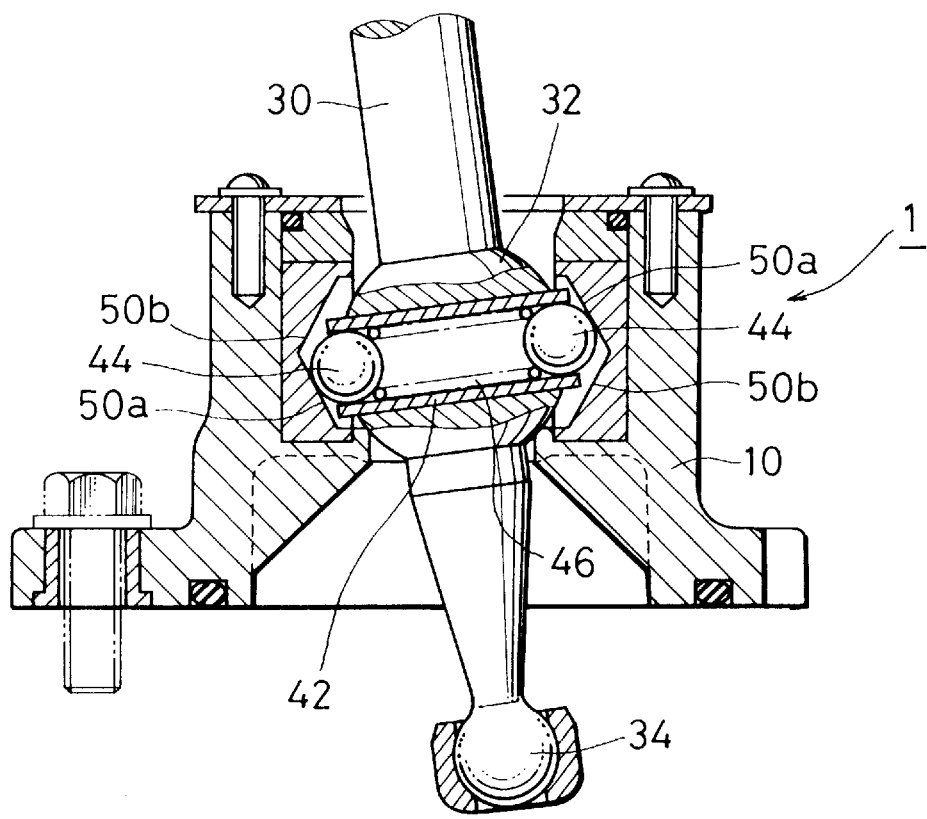
FIG. 5 is a view similar to FIG. 2 showing the shift lever in its shifted position.
Figure 6:
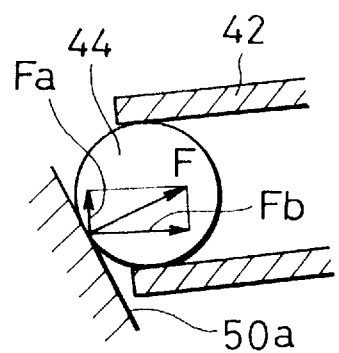
FIG. 6 is a partially expanded view of FIG. 5.

In the shift lever supporting mechanism 1 thus constructed, when tie shift lever 30 is moved from the neutral select position shown in FIG. 2 to the lower select position shown in FIG. 5 through the leftward selecting operation, as explain(ed before, each ball 44 moves along the cam surface 50a while being forced into the cylindrical sleeve 42 against the spring force of the spring 46. This causes the distance between the balls 44 to be smaller than that in the neutral select position of the shift lever 30, thereby compressing the spring 46 at a predetermined compression rate to increase the spring force thereof. Thus, each ball 44 is pressed to the cam surface 50a by an increased spring force of the spring 46. As will be appreciated, the compression rate of the spring 46 depends directly on an inclination angle of the cam surfaces 50a. Consequently, each ball 44 is diametrically subjected to an increased reactive force F from the cam surface 50a as shown in FIG. 6. Such a reactive force F is produced apparently by the increased spring force and may be divided into component forces Fa and Fb which are perpendicular to and parallel to a longitudinal axis of the cylindrical sleeve 42, respectively. As will be easily understood, the component force Fa is applied to the cylindrical sleeve 42 through the ball 44 and may act as a return force to bias the shift lever 30 to the neutral select position shown in FIG. 2.

As described previously, when the shift lever 30 is pivotally moved in the direction indicated by the arrow a1 or a2 in FIG. 2, that is, when the leftward or rightward selecting operation of the shift lever 30 is carried out, each ball 44 is moved along the cam surface 50a or 50b. The compression rate of the spring 46 may change depending on the inclination angles of the cam surfaces 50a and 50b. Therefore, the inclination angles of the cam surfaces 50a and 50b may be individually determined so that the compression rate of the spring 46 and the resultant component force Fa in the higher select position of the shift lever 30 are different from those in the lower select position of the shift lever 30. Thus, the return force in the higher select position of the shift lever 30 may be determined independently of that in the lower select position of the shift lever 30.

Figure 7:
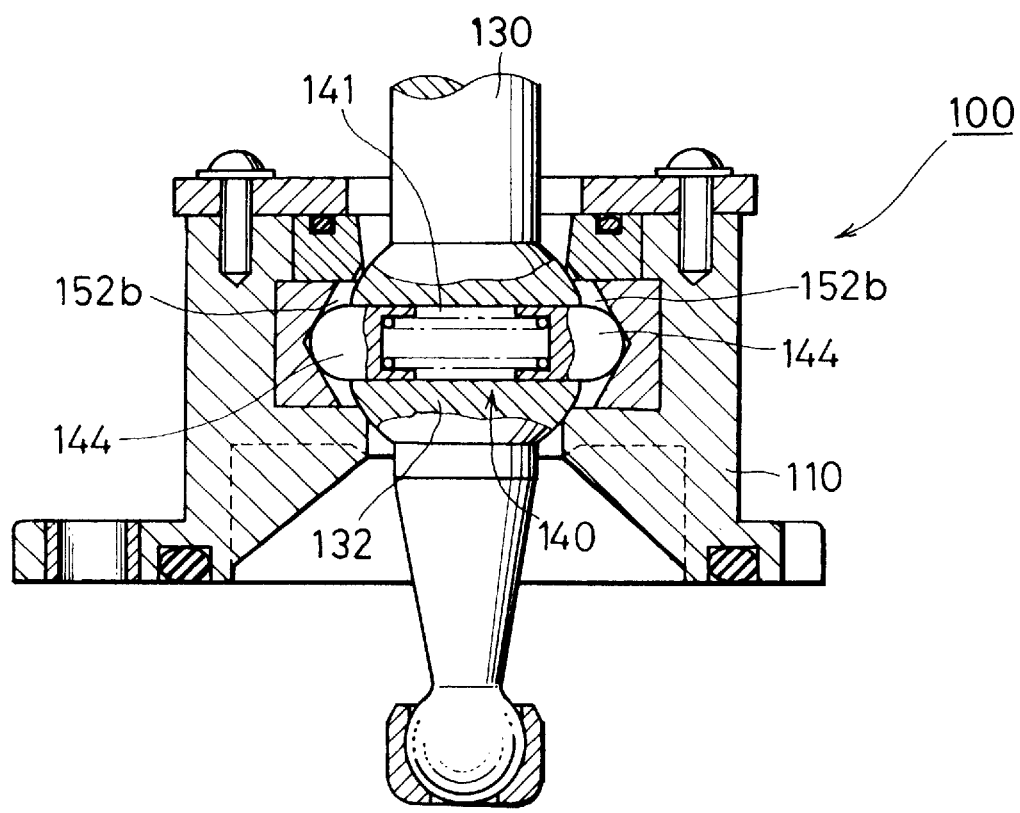
FIG. 7 is a sectional view similar to FIG. 2 showing a shift lever supporting mechanism according to a second embodiment of the invention.
Figure 8:
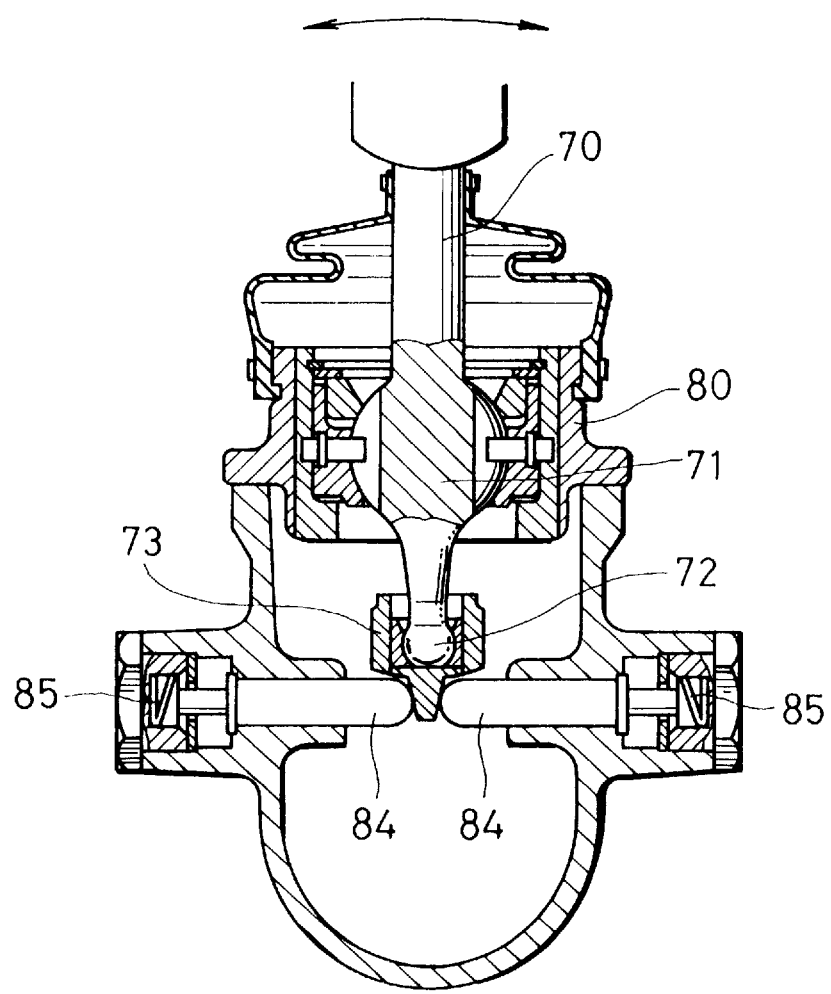
FIG. 8 is a sectional view showing a conventional shift lever supporting mechanism.

FIG. 7 shows a second embodiment of the invention. This embodiment is modification of the FIG. 2 construction. Parts that are the same as those in FIG. 2 are given like reference numbers and their description will not be repeated.

As shown in FIG. 7, in a shift lever supporting mechanism 100, a pair of bullet-like pins 144 are used as spherical members in place of the balls 44 of FIG. 2. Each pin 144 is formed with a hemispherical surface at one end thereof. Further, a hollow support 140 corresponding to the hollow support 40 of FIG. 2 is constituted of only a through bore 141 corresponding to the through bore 41 of FIG. 2, i.e., the cylindrical sleeve 42 of FIG. 2 is not used. Each pin 144 is slidably received in the through bore 141 in such a manner that the hemispherical surface thereof outwardly projects from an open end of the through bore 141. As will be understood, in this embodiment, the pins 144 are directly engaged in cam grooves 152b so that an enlarged spherical portion 132 of a shift lever 130 is restricted by the direction of pivotal movement in a shift lever retainer 110.

In the embodiments described above, a pair of balls 44 (pins 144) and a pair of cam portions 50 (holders 52) are used. However, either one of these elements may be removed to simplify the construction of the shift lever supporting mechanism. In addition, the cam portion 50 may be formed on the shift lever retainer 10 to omit the holder 52. Further, the spring 46 may be a coil spring, a leaf spring, and an elastic member formed of rubber or resin.

The preferred embodiment herein described is intended to be illustrative of the invention and not to limit the invention to the precise form herein described. It is chosen and described to explain the principles of the invention and their application and practical use to enable others skilled in the art to practice the invention.

What is claimed is:

1. A shift lever supporting mechanism for supporting a shift lever in a manual transmission and having a shift lever retainer, the shift lever having an enlarged spherical portion movably retained in the shift lever retainer through sphere-to-sphere engagement so that the shift lever is pivotally moved for performing the selecting and shifting operations, comprising:

a hollow support provided on the enlarged spherical portion of the shift lever and aligned with a rotational axis of the enlarged spherical portion for the selecting and shifting operations of the shift lever;

at least one spherical member received in said hollow support;

a spring received in said hollow support for biasing the spherical member; and at least one cam portion provided on the shift lever retainer and having at least one inclined cam surface;

said at least one spherical member being biased against said at least one cam portion by a spring force of said spring, said at least one spherical member moving along said inclined cam surface of said cam portion while being forced into said hollow support against the spring force of said spring, when the shift lever is moved for performing the selecting and shifting operations, thereby producing a restoring force on the shift lever.

2. The shift lever supporting mechanism as defined in claim 1 wherein said hollow support penetrates through the enlarged spherical portion, and wherein said at least one spherical member and said at least one cam portion are two in number, said spherical members being arranged at respective ends of said hollow support, said spherical members being biased against said cam portions.

3. The shift lever supporting mechanism as defined in claim 2 wherein said hollow support includes a cylindrical sleeve having opposed end portions and penetrates through the enlarged spherical portion, and wherein said cam portions are formed as cam grooves extending in the directions along which the enlarged spherical portion rotates when the shift lever is moved for performing the selecting and shifting operations, said end portions of said cylindrical sleeve being inserted in said cam grooves, so that the enlarged spherical portion of the shift lever is restricted by the direction of pivotal movement in the shift lever retainer.

4. The shift lever supporting mechanism as defined in claim 2 wherein said hollow support includes a through bore formed in the enlarged spherical portion, and wherein said cam portions are formed as cam grooves extending in the directions along which the enlarged spherical portion rotates when the shift lever is moved for performing the selecting and shifting operations, said spherical members being inserted in said cam grooves, so that the enlarged spherical portion of the shift lever is restricted by the direction of pivotal movement in the shift lever retainer.

5. The shift lever supporting mechanism as defined in claim 1 wherein said at least one cam surface includes two cam surfaces corresponding to directions for the selecting and shifting operations of the shift lever.

* * * * *